US011003753B2

(12) United States Patent
Oh et al.

(10) Patent No.: US 11,003,753 B2
(45) Date of Patent: May 11, 2021

(54) METHOD FOR RECOGNIZING FINGERPRINT, AND ELECTRONIC DEVICE AND STORAGE MEDIUM THEREFOR

(71) Applicant: Samsung Electronics Co., Ltd., Gyeonggi-do (KR)

(72) Inventors: Eun Young Oh, Daegu (KR); Min Soo Kim, Gyeongsangbuk-do (KR); Jong Moo Lee, Seoul (KR); Jin Wan An, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 16/229,294

(22) Filed: Dec. 21, 2018

(65) Prior Publication Data
US 2019/0228139 A1 Jul. 25, 2019

(30) Foreign Application Priority Data
Jan. 24, 2018 (KR) .......................... 10-2018-0008917

(51) Int. Cl.
*G06F 21/00* (2013.01)
*G06F 21/32* (2013.01)
(Continued)

(52) U.S. Cl.
CPC .......... *G06F 21/32* (2013.01); *G06F 3/04883* (2013.01); *G06K 9/0002* (2013.01); *G06K 9/00013* (2013.01); *G06K 9/00067* (2013.01)

(58) Field of Classification Search
CPC ................. G06F 21/32; G06F 3/04883; G06F 2203/04105; G06F 3/0486; G06K 9/00013; G06K 9/00067; G06K 9/0002
See application file for complete search history.

(56) References Cited

U.S. PATENT DOCUMENTS

2010/0240415 A1  9/2010  Kim et al.
2014/0302818 A1  10/2014  Fyke
(Continued)

FOREIGN PATENT DOCUMENTS

EP          3 211 514 A1     8/2017
KR    10-2015-0018349 A     2/2015
(Continued)

OTHER PUBLICATIONS

International Search Report dated Mar. 15, 2019.
European Search Report dated Sep. 18, 2020.

*Primary Examiner* — Brandon S Hoffman
*Assistant Examiner* — William A Corum, Jr.
(74) *Attorney, Agent, or Firm* — Cha & Reiter, LLC.

(57) ABSTRACT

According to certain embodiments, an electronic device comprises a housing comprising a front surface and a rear surface oriented in a direction opposite to the front surface, a touchscreen display exposed through at least a portion of the front surface, a fingerprint sensor arranged between the touchscreen display and the rear surface underlapping a region of the touchscreen display when viewed from above the front surface, at least one processor operatively connected to the touchscreen display and the fingerprint sensor, and a memory operatively connected to the at least one processor, wherein the memory stores instructions for causing the at least one processor, when executed, to perform operations comprising displaying a user interface comprising an object on the touchscreen display, receiving a gesture input for dragging the object toward the region, the gesture input inputted through the touchscreen display, identifying whether a finger providing the gesture input is a predetermined finger registered for authentication through the fingerprint sensor, and activating the fingerprint sensor based at least in part on the identification.

20 Claims, 17 Drawing Sheets

(51) Int. Cl.
 *G06K 9/00* (2006.01)
 *G06F 3/0488* (2013.01)

(56) References Cited

U.S. PATENT DOCUMENTS

| | | |
|---|---|---|
| 2015/0371073 A1 | 12/2015 | Cho et al. |
| 2016/0078268 A1 | 3/2016 | Mankowski et al. |
| 2016/0171281 A1 | 6/2016 | Park et al. |
| 2016/0180146 A1 | 6/2016 | Setterberg et al. |
| 2017/0316250 A1 | 11/2017 | Roh et al. |
| 2017/0344782 A1 | 11/2017 | Andersson |
| 2017/0351850 A1* | 12/2017 | Jin .................... H04W 12/0608 |
| 2018/0260803 A1 | 9/2018 | Seol et al. |
| 2019/0310723 A1* | 10/2019 | Kang ...................... H04W 4/80 |
| 2019/0391432 A1* | 12/2019 | Lee .......................... G06F 1/169 |

FOREIGN PATENT DOCUMENTS

| | | |
|---|---|---|
| KR | 10-2017-0014904 A | 2/2017 |
| KR | 10-2017-0032742 A | 3/2017 |

\* cited by examiner

METHOD FOR RECOGNIZING FINGERPRINT, AND ELECTRONIC DEVICE AND STORAGE MEDIUM THEREFOR

CROSS-REFERENCE TO RELATED APPLICATION(S)

This application claims the benefit under 35 U.S.C. § 119(a) of a Korean patent application filed in the Korean Intellectual Property Office on Jan. 24, 2018 and assigned Serial No. 10-2018-0008917, the entire disclosure of which is incorporated herein by reference.

TECHNICAL FIELD

This disclosure is related to recognizing a fingerprint and an electronic device therefor.

BACKGROUND

Recently, electronic devices, especially smartphones, are storing more and more of our personal information and data. It has become important to verify the identity of a user before providing access, to avoid unauthorized and potentially nefarious use of such personal information and data. The above information is presented as background information only to assist with an understanding of the present disclosure. No determination has been made, and no assertion is made, as to whether any of the above might be applicable as prior art with regard to the present disclosure.

SUMMARY

Along with enhancing the performance of electronic devices, various biometric recognition techniques including fingerprint recognition can be been applied to portable electronic devices. User authentication based on fingerprint recognition (or fingerprint authentication) is simple and improves security.

An electronic device offering fingerprint recognition may unnecessarily consume current due to an activated fingerprint sensor.

In such an electronic device, a fingerprint image may be deformed corresponding to the drag/swipe speed of a drag/swipe gesture input, resulting in an error, failure, or processing delay in fingerprint recognition.

Certain embodiments may reduce unnecessary current consumption by determining/identifying the time to activate a fingerprint sensor based at least in part on pressure profile information.

Certain embodiments may improve fingerprint recognition rate by correcting fingerprint image deformation based at least in part on pressure profile information.

According to certain embodiments, an electronic device includes a housing including a front surface and a rear surface oriented in a direction opposite to the front surface, a touchscreen display exposed through a portion of the front surface, a fingerprint sensor arranged between the display and the rear surface in such a way as to overlap a region of the display when viewed from the top of the front surface, a processor operatively connected to the display and the fingerprint sensor, and a memory operatively connected to the processor, in which the memory stores instructions for causing the processor, when executed, to display a user interface including an object on the display, to receive a gesture input for dragging the object toward the region, the gesture input inputted through the display, to identify whether a finger providing the gesture input is a finger registered for authentication through the fingerprint sensor, and to activate the fingerprint sensor based at least in part on the identification.

According to certain embodiments, a method for operating an electronic device includes displaying a user interface including an object on a display of the electronic device, receiving a gesture input for dragging the object toward a region of the display, the gesture input inputted through the display, identifying whether a finger providing the gesture input is a finger registered for authentication through a fingerprint sensor, and activating the fingerprint sensor based at least in part on the identification.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
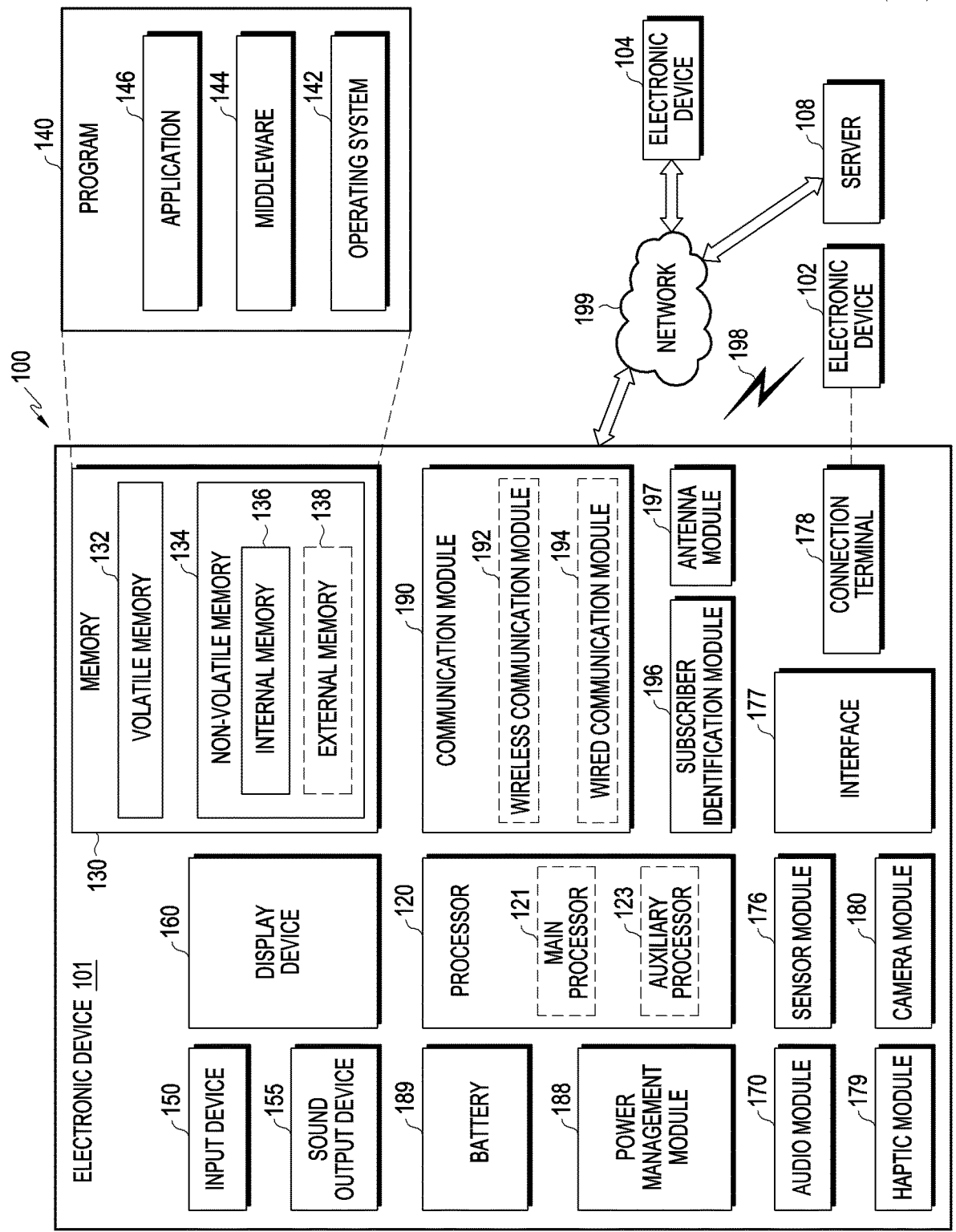
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, cloud computing, distributed computing, or client-server computing may be used.

Figure 2:
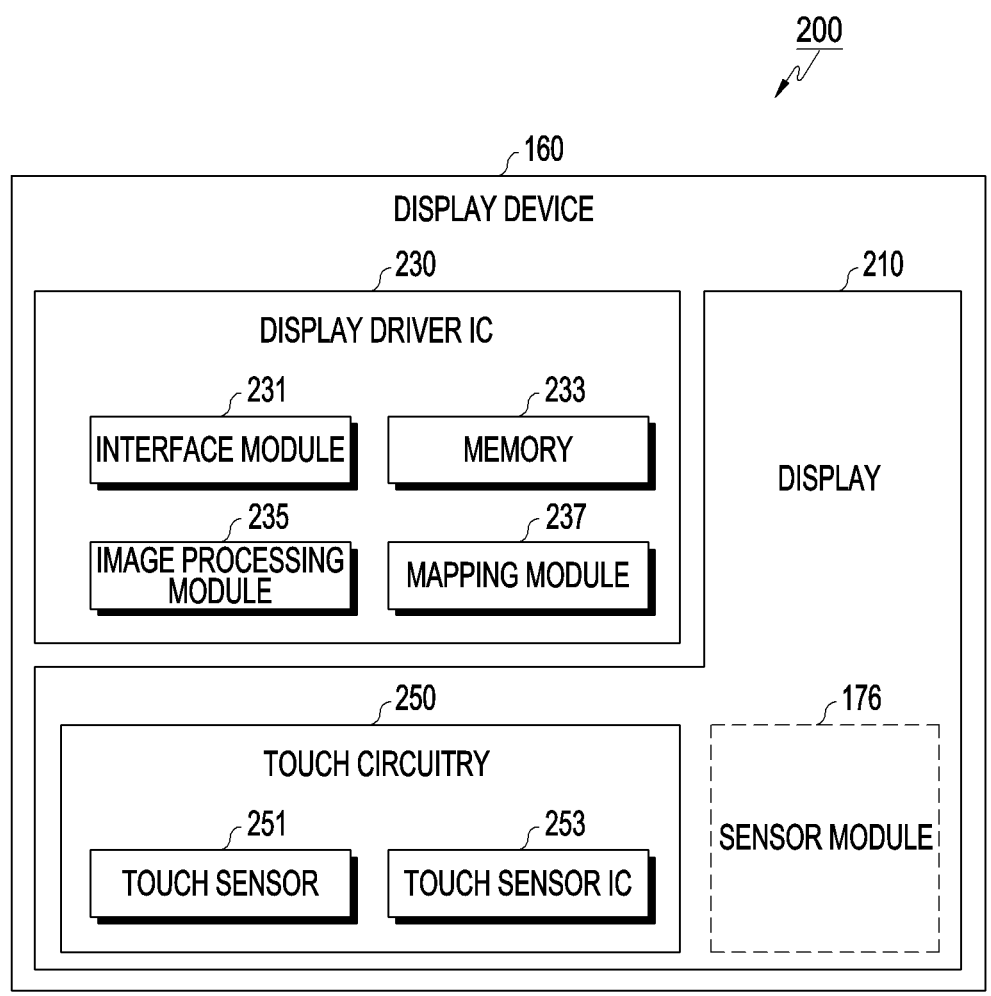
FIG. 2 is a block diagram illustrating a display device according to certain embodiments.

FIG. 2 is a block diagram 200 illustrating the display device 160 (e.g., the display device 160 of FIG. 1) according to certain embodiments. Referring to FIG. 2, the display device 160 may include a display 210 and a display driver integrated circuit (IC) (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. For example, the touch sensor IC 253 may detect a touch input or a hovering input by measuring a change in a signal (e.g., a voltage, a quantity of light, a resistance, or a quantity of one or more electric charges) corresponding to the certain position on the display 210. The touch sensor IC 253 may provide information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of the display device 160 (e.g., the display 210 or the DDI 230) or one portion of the touch circuitry 250). For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information related to a touch input received via a partial or whole area of the display 210. According to an embodiment, the touch sensor 251 or the sensor module 176 may be disposed between pixels in a pixel layer of the display 210, or over or under the pixel layer.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
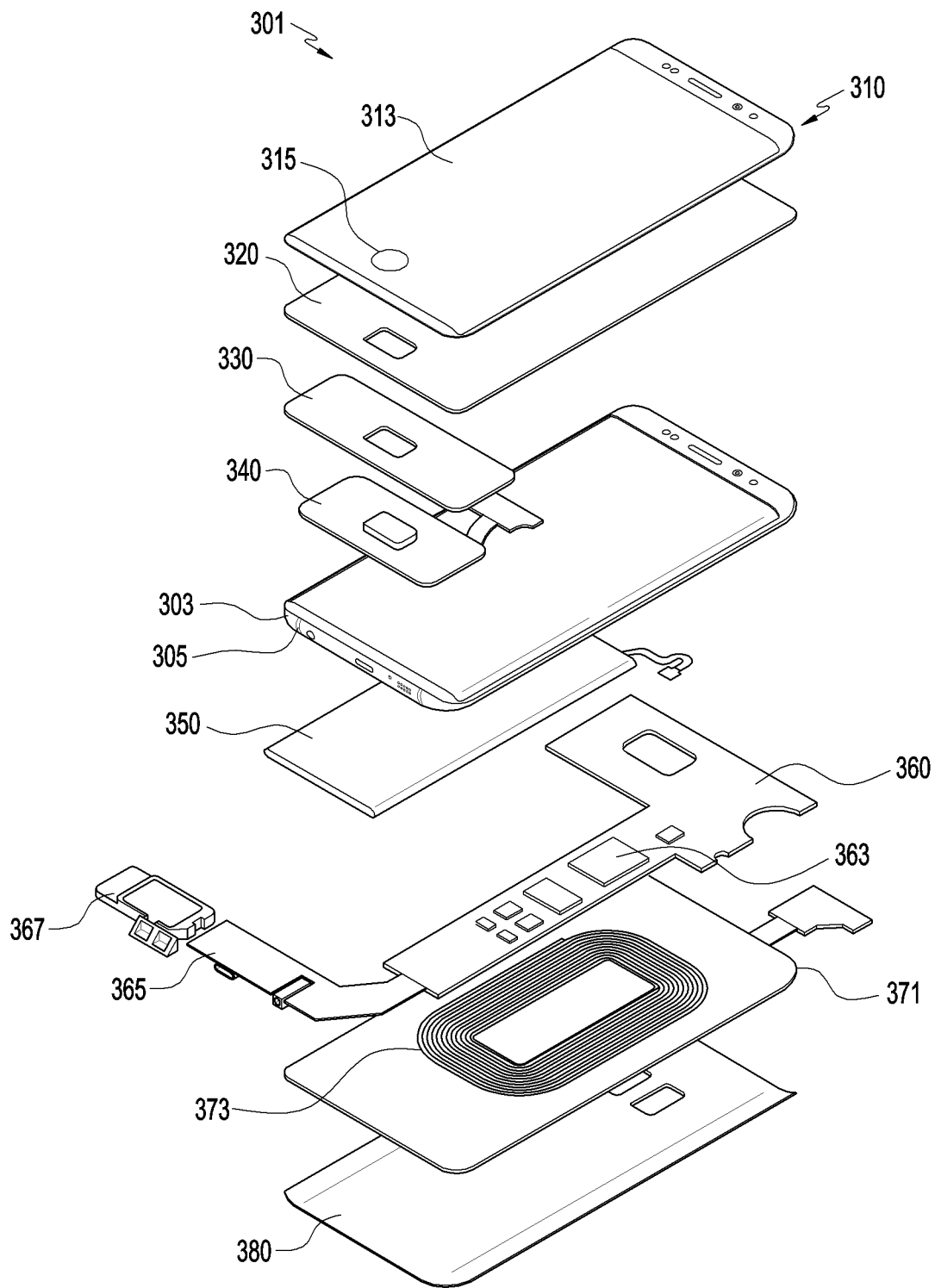
FIG. 3A is an expanded perspective view illustrating an electronic device according to certain embodiments.
Figure 3B:
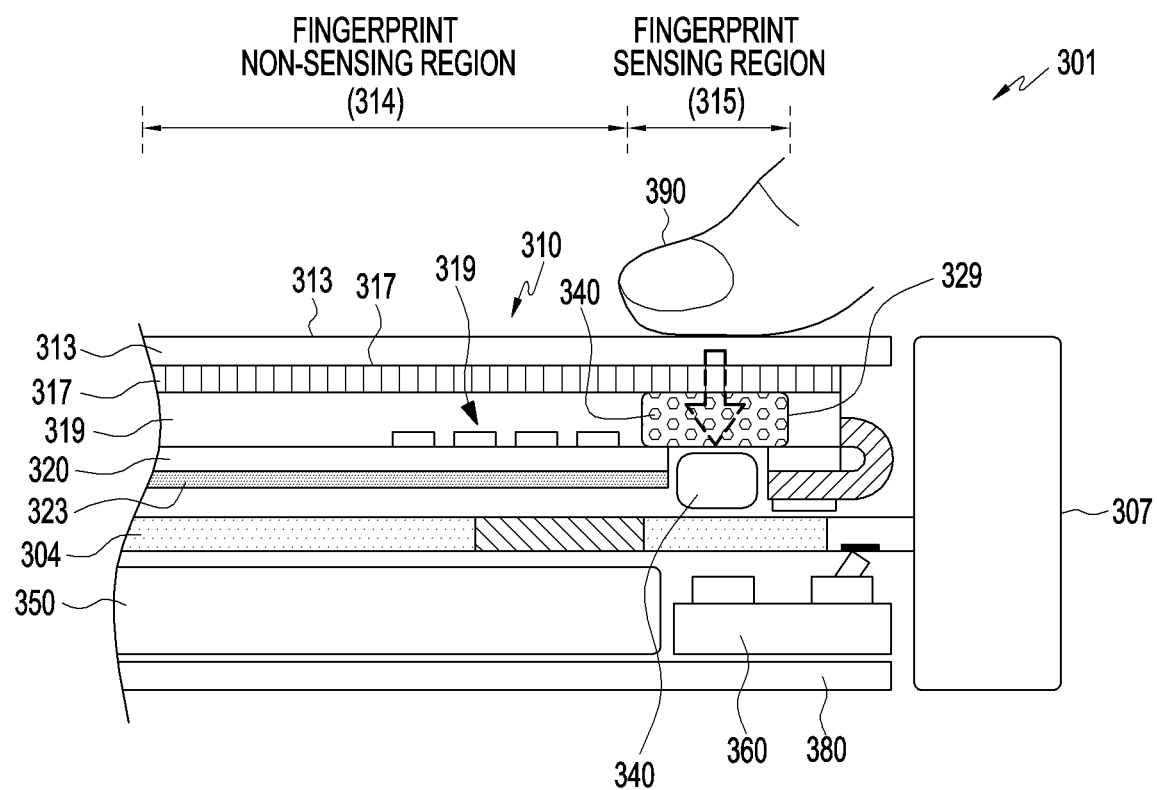
FIG. 3B is a cross-sectional view of an electronic device according to certain embodiments.

FIG. 3A is an expanded perspective view illustrating an electronic device according to certain embodiments, and FIG. 3B is a cross-sectional view of an electronic device according to certain embodiments.

Referring to FIGS. 3A and 3B, an electronic device 301 (e.g., the electronic device 101 of FIG. 1) may include a housing 303, a touchscreen display 310 (e.g., the display device 160), a digitizer panel 320, a pressure sensor 330, a fingerprint sensor 340, a battery 350 (e.g., the battery 189), a circuit board 360, a sound component 367 (e.g., the sound output device 155), a wireless charging circuit board 371, a wireless charging coil 373, and/or a rear surface such as a rear cover 380.

The housing 303 may protect electronic components.

A front cover 313, a touchscreen panel 317, and/or a display panel 319 may be stacked on the front surface of the housing 303. The front cover 313 may be divided into a fingerprint sensing region 315, on which fingerprint recognition may be performed by the fingerprint sensor 340, and a fingerprint non-sensing region 314, on which fingerprint recognition may not be performed by the fingerprint sensor 340.

In an embodiment, the stacking orders of the touchscreen panel 317 and the display panel 319 may be interchanged. The front cover 313 may include a glass material. In an embodiment, the front cover 313 may include a transparent resin material without being limited to a glass material.

The touchscreen display 310 may include the front cover 313, the display panel 319, and/or the touchscreen panel 317. The touchscreen display 310 may display a screen at a designated aspect ratio (e.g., 18.5:9 (default), 21:9, etc.).

In an embodiment, the touchscreen display 310 may display a user interface (UI) according to a floating mode or a split mode.

In an embodiment, the touchscreen display 310 may display a UI including an application region or a control region. The touchscreen display 310 may display a control object (e.g., a soft key) in the control region.

In an embodiment, the touchscreen display 310 may have a Y-OCTA (Youm On-Cell Touch AMOLED (Active Matrix Organic Light-Emitting Diode)) structure, and the touchscreen panel 317 may be attached to the display panel 319 as an add-on cell type.

The touchscreen panel 317 may receive a user's touch input on the front cover 313 (or front surface; hereinafter, "front cover" shall be used). The touchscreen panel 317 may receive an electrical signal as the user's touch input. The touchscreen panel 317 may have the same size as the front cover 313 and receive, as the electrical signal, the same coordinates as coordinates corresponding to the touch input on the front cover 313. In an embodiment, the touchscreen panel 317 may be smaller or larger in size than the front cover 313, without being limited to the same size as the front cover 313. The touchscreen panel 317 may include a receive (RX) electrode and a transmit (TX) electrode and may be driven in a capacitive manner (as will be described in FIGS. 6A and 6B). In an alternative embodiment, the touchscreen panel 317 may also be driven in a pressure manner or an optical manner (wherein an infrared light scans and detects the position of a touch). The RX electrode and the TX electrode may be arranged on the same layer. In an embodiment, the RX electrode may be stacked on a layer that is different from, or the same as, a layer on which the TX electrode is arranged.

In an embodiment, the rear cover 380 may be arranged under the housing 303. The rear cover 380 may include a glass material. In an alternative embodiment, the rear cover 380 may include various materials such as metal, resin, or the like.

In an embodiment, the pressure sensor 330 may be arranged between the digitizer panel 320 and the housing 303. The pressure sensor 330 may include the RX electrode and the TX electrode. The RX electrode and the TX electrode may be stacked on different layers, respectively. A dielectric may be arranged between the RX electrode and the TX electrode, which may be arranged spaced apart from each other. The pressure sensor 330 may identify a change in capacitance between the RX electrode and the TX electrode caused by a change in a distance between the RX electrode and the TX electrode due to external pressure (e.g., a user's touch input). The pressure sensor 330 may be arranged adjacent to the lower region of the front cover 313 (where the upper region is considered the location of the telephone speaker and the lower region of the front cover 313 is considered the location of the telephone microphone). In an embodiment, the pressure sensor 330 may also be arranged to be the same size as the entire front cover 313, without being limited to the arrangement adjacent to the bottom region of the front cover 313. The pressure sensor 330 may perform a function of a functional key such as a home key, etc.

In an embodiment, the fingerprint sensor 340 may be arranged between the digitizer panel 320 and a mid-plate 304 of the housing 303. In an embodiment, the fingerprint sensor 340 may be arranged between the pressure sensor 330 and the mid plate 304. The fingerprint sensor 340 may be arranged adjacent to the bottom region of the front cover 313. The fingerprint sensor 340 may be an optical fingerprint sensor. The fingerprint sensor 340 may use a light source of the display panel 319 or may include a light-receiving unit (such as a charged-coupled device CCD or a camera) for receiving reflected light when a user's finger makes contact with the front cover 313.

In an embodiment, the fingerprint sensor 340 may obtain a fingerprint in an area manner and/or a swipe manner. In the area manner, the fingerprint sensor 340 may capture the entire fingerprint of a stationary finger on/under a surface thereof at a point in time. In the swipe manner, the fingerprint sensor 340 may obtain the entire fingerprint by continuously capturing the portions of a fingerprint of a finger 390 as the finger traverses the surface of the fingerprint sensor 340 on/under the surface.

In an embodiment, the fingerprint sensor 340 may include a light-emitting unit for outputting light as a separate light source without using the light source of the display panel 319.

In an embodiment, the circuit board 360 may be arranged inside the housing 303. Various electronic components 363 such as a processor (e.g., the processor 120), a communication module (e.g., the communication module 190), and the like may be mounted on the circuit board 360. The circuit board 360 may be fixed to the housing 303 through a coupling member (not shown) such as a screw. The circuit board 360 may be electrically connected with the housing 303 for use as a ground for an antenna. In an embodiment, the circuit board 360 may also be used as a feeding unit for applying an electric current to an antenna radiator, without being limited to the use as a ground. The circuit board 360 may be electrically connected with a sub circuit board 365. In an embodiment, the circuit board 360 may be electrically connected with the sub circuit board 365 through a connector (not shown). The sub circuit board 365 may be electrically connected with the sound component 367. In an embodiment, the sound component 367 may be directly connected with the circuit board 360, without being limited to the connection with the sub circuit board 365.

A shielding layer 323 may be electrically connected with a ground of the digitizer panel 320 or the display panel 319. The shielding layer 323 may absorb a noise signal through the ground. The shielding layer 323 may be attached to the housing 303, having a dielectric interposed therebetween to avoid a ground connection with the housing 303. The shielding layer 323 may include a sheet of copper material.

A housing antenna 307 may include at least a part of the surface of the housing 303 exposed to outside as an antenna structure or radiator.

In an embodiment, the surface of the housing 303 may include a metallic material. On the surface of the housing 303 may be formed a segment portion 305. The segment portion 305 may include a dielectric, and the housing 303 may be divided into two parts with respect to the segment portion 305. For example, one of the two parts may be used as a first radiator for the housing antenna 307 and the other part may be used as a second radiator for the housing antenna 307.

In an embodiment, the housing antenna 307 may be an inverted F-antenna. The inverted F-antenna may be connected with one feeding and one ground.

In an embodiment, the housing antenna 307 may be electrically connected with a wireless communication module (e.g., the wireless communication module 192) arranged on the circuit board 360 through a connection member.

Figure 4:
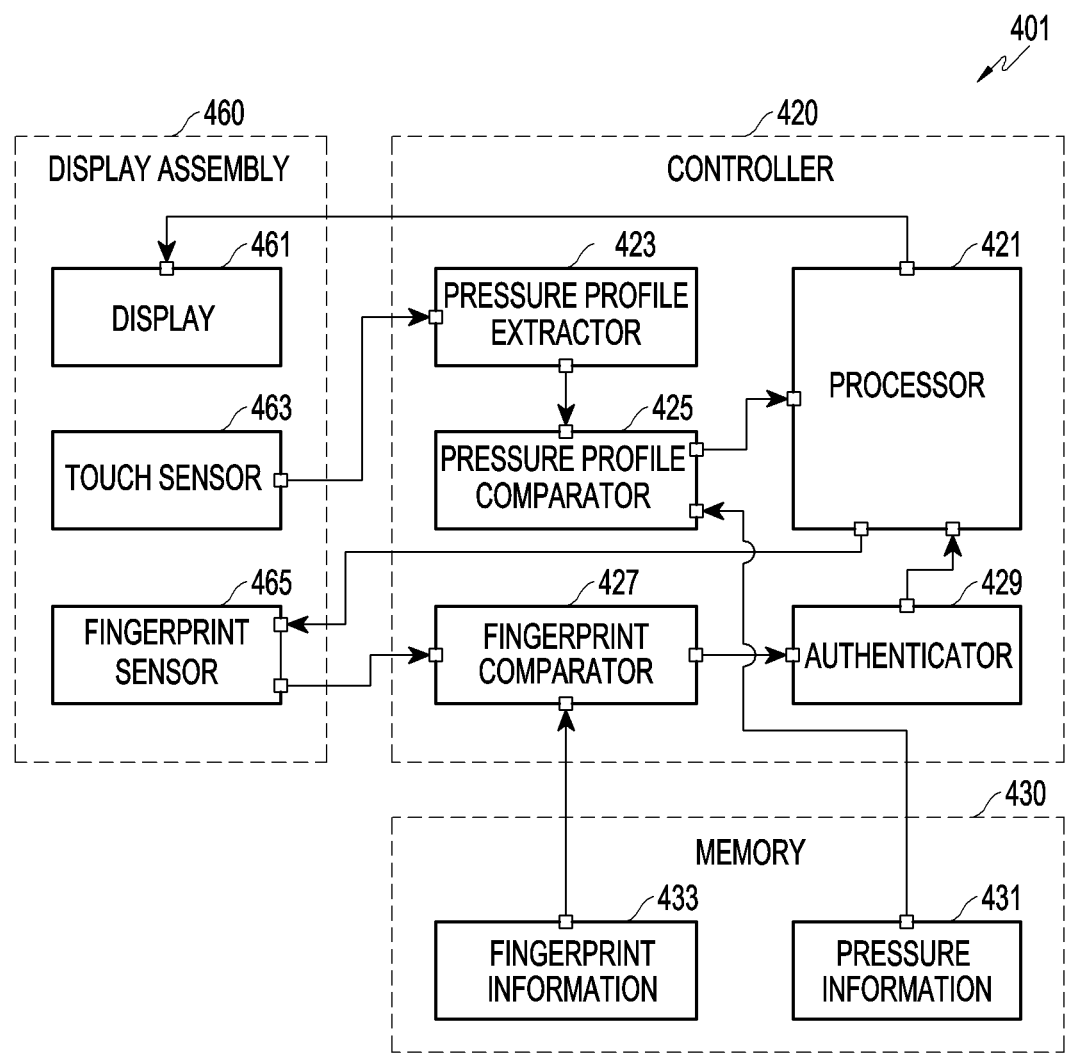
FIG. 4 illustrates an electronic device according to certain embodiments.

FIG. 4 illustrates an electronic device according to certain embodiments.

An electronic device 401 (e.g., the electronic device 101 or 301) may include a display assembly 460 (e.g., the touchscreen display 310 or the display device 160), a memory 430 (e.g., the memory 130), and/or a controller 420.

The display assembly 460 may include a display 461 a touch sensor 463 (e.g., the touch sensor 251), and/or a fingerprint sensor 465 (e.g., the fingerprint sensor 340).

In an embodiment, the touch sensor 463 may include a pressure sensor (e.g., the pressure sensor 330).

The memory 430 may store fingerprint information 433 including a fingerprint image/data and/or pressure information 431 including a pressure profile.

The controller 420 may include a pressure profile extractor 423, a pressure profile comparator 425, a fingerprint comparator 427, an authenticator 429, and/or a processor 421. The pressure profile extractor 423 can include a register that stores instantaneous readings from the touch sensor 463. The pressure profile comparator 425 can be a comparator that compares the fingerprint information 433 with the content of the pressure profile extractor 423 (the inputs), and provides the outcome of the comparison. In certain embodiments, the pressure profile comparator 425 can provide an indication to the processor 421 whether the inputs are within or not within a predetermined margin of each other.

In certain embodiments, the processor 421, pressure profile extractor 423, pressure profile comparator 425, fingerprint comparator 427 and authenticator 429 can be integrated as an ASIC controller 420.

The display 461 may display a user interface including an object (e.g., a graphics element, a window, an item, a button, an icon, a menu, and/or a menu item).

In an embodiment, the display assembly 460 may receive a user's gesture input and deliver position information and pressure information regarding the gesture input to the pressure profile extractor 423.

In an embodiment, the touch sensor 463 may receive the user's gesture input and deliver the pressure information regarding the gesture input to the pressure profile extractor 423.

The pressure profile extractor 423 may receive pressure information regarding a touch input from the touch sensor 463 of the display assembly 460 and obtain a pressure profile from the pressure information.

The pressure profile comparator 425 may compare the pressure profile received from the pressure profile extractor 423 with a pressure profile stored in the memory 430. The pressure profile comparator 425 may deliver the result of the comparison between the pressure profiles to the processor 421.

The fingerprint comparator 427 may receive fingerprint information from the fingerprint sensor 465, and the fingerprint comparator 427 may compare the received fingerprint information with fingerprint information 433 stored in the memory 430. The fingerprint comparator 427 may deliver the result of the comparison between the fingerprint information to the authenticator 429.

The authenticator 429 may deliver the result of the authentication based at least in part on the result of the comparison between the fingerprint information to the processor 421.

The processor 421 may determine or identify whether the gesture input is an input using a registered finger based at least in part on the result of the comparison between the pressure profiles received from the pressure profile comparator 425.

When the gesture input is the input using a registered finger, the processor 421 may activate the fingerprint sensor 465 through the display 461. For example, the processor 421 may deliver a sensor activation signal to the fingerprint sensor 465. The fingerprint sensor 465 may switch from an inactive state to a state in which fingerprint reception/recognition is possible in response to the sensor activation signal.

In an embodiment, when the gesture input is an input using a registered finger, the processor 421 may display a designated user interface (e.g., a message, a window, a screen, and/or an indicator) or a guide screen on the display.

In an embodiment, when the gesture input is an input using a registered finger, the processor 421 may deliver a high bright mode (HBM) signal for ensuring that the light from the display is sufficient to cause a sufficient light reflection from the finger for fingerprint recognition to the display 461. The display 461 may increase the brightness of the screen in response to the HBM signal.

In an embodiment, unless the gesture input is an input using a registered finger, the processor 421 may perform a first function.

In an embodiment, the first function may include a function for displaying the designated user interface (e.g., a message, a window, a screen, and/or an indicator) or the guide screen on the display.

The authenticator 429 may deliver the result of the authentication based at least in part on the result of the comparison between the fingerprint information to the processor 421.

The processor 421 may determine or identify whether fingerprint authentication is successful based at least in part on the result of the authentication received from the authenticator 429.

In an embodiment, when fingerprint authentication is successful, the processor 421 may perform a second function.

In an embodiment, the second function may include at least one of an unlock function, an application execution function, a personal authentication function, a multimedia control function, an input interface change function, and/or a mode switch function.

In an embodiment, when fingerprint authentication fails, the processor 421 may perform a third function.

In an embodiment, the third function may be a function for notifying the user of an authentication failure. In an embodiment, the electronic device may display the designated user interface (e.g., a message, a window, a screen, and/or an indicator) or the guide screen on the display.

According to certain embodiments, the electronic device 401 includes a housing including a front surface and a rear surface oriented in a direction opposite to the front surface, a touchscreen display 310 exposed through a portion of the front surface, a fingerprint sensor 340/465 arranged between the touchscreen display 310 and the rear surface in such a way as to underlap a region 315 of the touchscreen display 310 when viewed from the above of the front surface, a processor 421 operatively connected to the display 461 and the fingerprint sensor 465, and a memory 430 operatively connected to the processor 421, in which the memory 430 stores instructions for causing the processor 421, when executed, to display a user interface including an object on the touchscreen display 310, to receive a gesture input for dragging the object toward the region, the gesture input inputted through the touchscreen display 310, to determine or identify whether a finger providing the gesture input is a finger registered for authentication through the fingerprint sensor 340/465, and to activate the fingerprint sensor 340/465 based at least in part on the determination or the identification.

According to certain embodiments, the instructions may cause the processor 421 to provide a graphics user interface indicating that the fingerprint sensor 340/465 has been activated.

According to certain embodiments, the instructions may cause the processor 421 to determine or identify whether the gesture input is an input using a registered finger, based at least in part on at least one of a pressure applied to the touchscreen display 310 by the finger providing the gesture input, a rate of a region touched by the finger providing the gesture input to an effective pressure region formed by a touch, an increase rate of the pressure or region of the finger touch, or a pressure change rate with respect to the coordinates shift that occurs from the gesture input.

According to certain embodiments, the instructions may cause the processor 421 to display a graphics user interface on the display 461, when the finger providing the gesture input is not a finger registered for authentication through the fingerprint sensor 465, in the inactive state of the fingerprint sensor 465.

According to certain embodiments, the memory 430 may store pressure information associated with fingers registered for authentication through the fingerprint sensor.

According to certain embodiments, the instructions may cause the processor 421 to compare fingerprint information of the finger providing the gesture with fingerprint information stored in the memory 430, of fingers registered for authentication through the fingerprint sensor 465, and to authenticate a user providing the gesture input based at least in part on the comparison.

According to certain embodiments, the instructions may cause the processor 421 to provide a graphics user interface guiding fingerprint registration in a moving state.

According to certain embodiments, the instructions may cause the processor 421 to provide a graphics user interface guiding fingerprint registration in a moving state for a plurality of directions.

Figure 5:
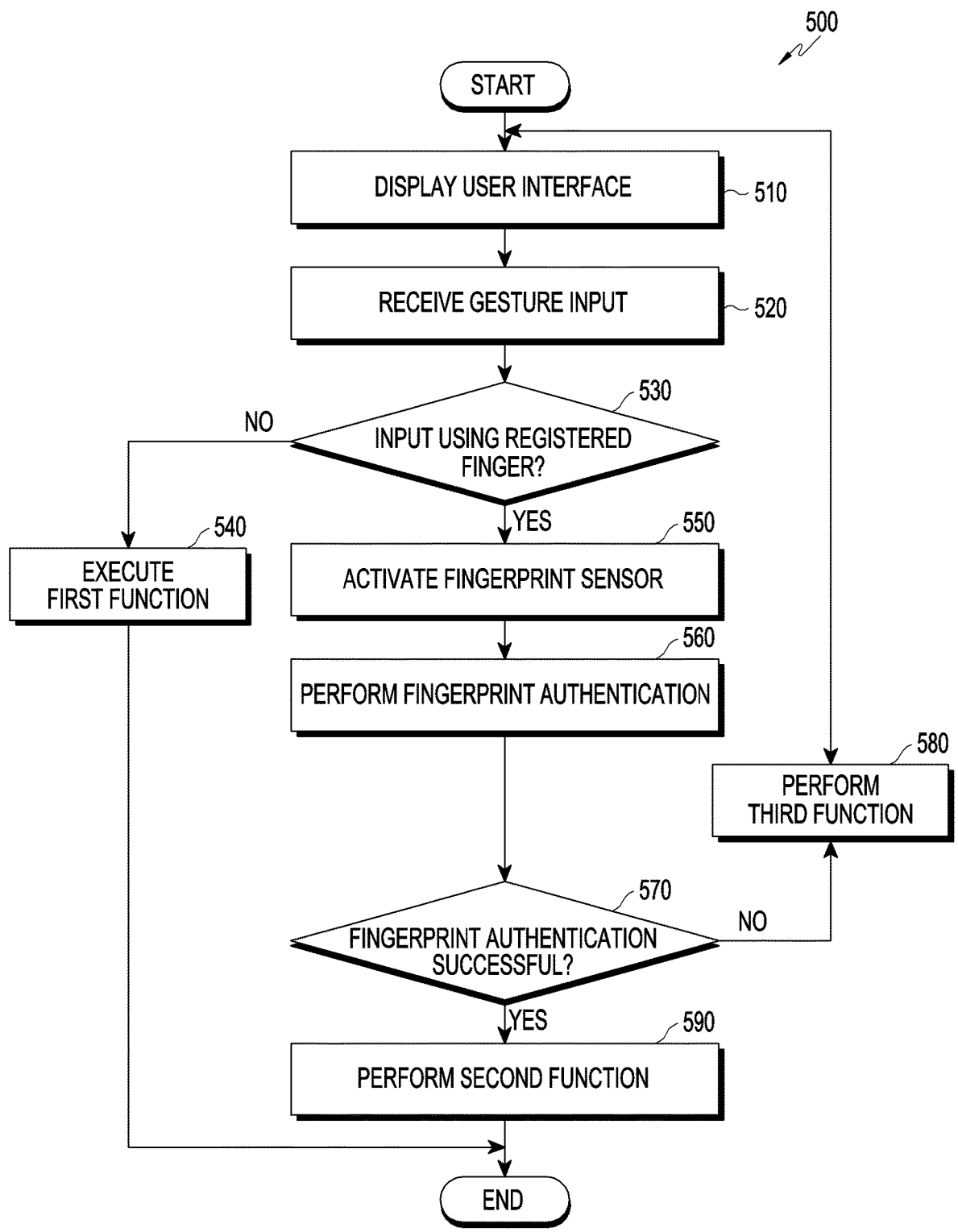
FIG. 5 is a flowchart illustrating a method for operating an electronic device according to certain embodiments.

FIG. 5 is a flowchart 500 illustrating a method for operating an electronic device according to certain embodiments. The method may include operations 510 through 590. Each step/operation of the method may be performed by the electronic device (e.g., the electronic device 101, 301, or 401), at least one processor (e.g., the processor 120 or 421) of the electronic device, or a controller (e.g., the controller 420) of the electronic device. In an embodiment, at least one of operations 510 through 590 may be omitted, the order of some of operations 510 through 590 may be changed, or other operations may be added.

In operation 510, the electronic device (e.g., the processor 120 or 421) may display a user interface including an object (e.g., a graphics element, a window, an item, a button, an icon, a menu, and/or a menu item) on the display.

In operation 520, the electronic device (e.g., the processor 120 or 421) may receive a user's gesture input by using the display (e.g., the touchscreen display 310), the touch screen panel 317, and/or the touch sensor 463 (e.g., the touch sensor 251 or the pressure sensor 330).

In an embodiment, the gesture input may be associated with the object displayed on the display.

In operation 530, the electronic device (e.g., the processor 120 or 421) may determine or identify whether the gesture input is an input using a registered finger.

In an embodiment, the electronic device may determine or identify whether the finger providing the gesture input is a finger registered for authentication through the fingerprint sensor (e.g., the fingerprint sensor 340 or 465).

In an embodiment, the electronic device may determine or identify whether pressure information (or a pressure profile) corresponding to the gesture input or the finger providing the gesture input matches registered (registered in a designated database or table) pressure information (or pressure profile) stored in the memory.

The electronic device may perform operation 550 when the gesture input is an input using a registered finger, and may perform operation 540 unless the gesture input is an input using a registered finger.

In an embodiment, the electronic device may determine or identify whether the gesture input is an input using a registered finger, based at least in part on at least one of a pressure applied to the display by the finger, a rate of an effective pressure region formed by a touch to a region touched by the finger, an increase rate of the pressure or region of the finger touch, or a pressure change rate with respect to the coordinates shift that occurs from the gesture input.

In operation 540, unless the gesture input is an input using a registered finger, the electronic device (e.g., the processor 120 or 421) may perform the first function.

In an embodiment, the first function may include a function for displaying the designated user interface (e.g., a message, a window, a screen, and/or an indicator) or the guide screen on the display.

In operation 550, when the gesture input is an input using a registered finger, the electronic device (e.g., the processor 120 or 421) may activate the fingerprint sensor.

In the inactive state, the fingerprint sensor may be in a state where the fingerprint sensor may not be able to perform at least some of functions that the fingerprint sensor may be able to perform in a normal mode or in an active state. For example, a light source that is used to irradiate the finger and fingerprint may be disabled, or not enabled. In certain embodiments, a switch may be disposed providing power to the light source for irradiating the finger and fingerprint. In an inactive state, the switch may be open, thereby inhibiting power to the light source. In cases where HBM light is used, the display may use normal light.

In an embodiment, in the active state, the fingerprint sensor may be in a power/sensor-on state. In the inactive state, the fingerprint sensor may be in a power/sensor-off state.

In an embodiment, the electronic device may maintain the exposure time of an image sensor (CCD or camera) of the fingerprint sensor during a designated threshold time or longer to suppress the noise caused by external ambient light (or sunlight). In an embodiment, the electronic device may control the display to output light of a particular frequency, such as infrared light.

In operation 560, the electronic device (e.g., the processor 120 or 421) may perform fingerprint authentication.

The electronic device may compare a user's fingerprint image/data obtained using the fingerprint sensor with fingerprint image/data previously stored in a memory (e.g., the memory 130) before fingerprint authentication is performed (or before the fingerprint sensor is activated).

In an embodiment, the electronic device may determine or identify the degree of agreement/the degree of matching/similarity between the obtained fingerprint image/data and the previously stored fingerprint image/data.

In an embodiment, the degree of agreement/the degree of matching/similarity may be determined based on the number of feature values/data/patterns/images of the obtained fingerprint image/data matching with feature values/data/patterns/images of the previously stored fingerprint image/data, or the rate of the number of the matching feature values/data/patterns/images with respect to the total number of feature values/data/patterns/images of the previously stored fingerprint image/data.

In an embodiment, the electronic device may provide a fast user fingerprint authentication process by using registered pressure profile information. The electronic device may generate a comparison fingerprint image candidate group from registered fingerprint images by using pressure profile information corresponding to a touch input with respect to the display. The electronic device may improve fingerprint authentication speed by preferentially performing a fingerprint matching operation with respect to a fingerprint image candidate group mapped to a pressure profile.

In operation 570, the electronic device may determine or identify whether fingerprint authentication is successful. The electronic device may perform operation 590 when fingerprint authentication is successful, and may perform operation 580 unless fingerprint authentication fails.

In an embodiment, the electronic device may determine or identify that fingerprint authentication is successful when an agreement/similarity value between the detected fingerprint image data and the previously stored fingerprint image data is greater than or equal to a preset threshold value. When the agreement/similarity value between the detected fingerprint image data and the previously stored fingerprint image data is less than preset threshold value, the electronic device may determine or identify that fingerprint authentication fails.

In operation 580, when fingerprint authentication fails, the electronic device (e.g., the processor 120 or 421) may perform the third function.

In an embodiment, the third function may be a function for notifying the user of an authentication failure. In an embodiment, the electronic device may display the designated user interface (e.g., a message, a window, a screen, and/or an indicator) or the guide screen on the display.

In operation 590, when fingerprint authentication is successful, the electronic device (e.g., the processor 120 or 421) may perform the second function.

In an embodiment, the second function may include at least one of an unlock function, an application execution function, a personal authentication function, a multimedia control function, an interface change function, and/or a mode switch function.

In an embodiment, a particular function of the electronic device or an application may be associated with fingerprint authentication by at least one of a user setting, automatic setting, and environment setting. The electronic device may store association information of fingerprint authentication with the particular function of the electronic device or the application in the memory.

The unlock function may include a function for unlocking a particular function/a graphics element through a fingerprint input. The application execution function may include a function for executing at least one of a game application, a social network service (SNS) application, a document editing application, a multimedia application, or a function for connecting to contact information through a communication application (e.g., a phone application or a message application). The personal authentication function may include a function for transmitting at least one of fingerprint information, personal/authentication/secrete information stored in the memory, information regarding an authentication result, and information configured in case of the successful authentication of an external electronic device (e.g., the electronic device 102 or 104). The multimedia control function may include a function for displaying a control menu (e.g., a volume control menu or a play menu), a volume control function (e.g., volume-up, volume-down, or muting), or a play control function (e.g., rewind, fast forward, pause, or play). The interface change function may include a function for changing at least one of an input interface, an output interface, or a communication interface. The mode switch function may include a function for switching from a first mode (e.g., a normal mode, a guest mode, or a restricted mode) to a second mode (e.g., an editing mode, a manager mode, or a derestricted mode).

According to certain embodiments, a method for operating an electronic device (e.g., the electronic device 101, 301, or 401) may include displaying a user interface including an object on a display (e.g., the touchscreen display 310 or 461) of the electronic device, receiving a gesture input for dragging the object toward a region of the display, the gesture input inputted through the display, identifying whether a finger providing the gesture input is a finger registered for authentication through a fingerprint sensor (e.g., the fingerprint sensor 340 or 465), and activating the fingerprint sensor based at least in part on the identification.

According to certain embodiments, the method may further include providing a graphics user interface indicating that the fingerprint sensor has been activated.

According to certain embodiments, the identification may be performed based at least in part on at least one of a pressure applied to the display by a finger, a rate of an effective pressure region formed by the touch to a region touched by the finger, an increase rate of the pressure or region of the finger touch, or a pressure change rate with respect to the coordinates shift that occurs from the gesture input.

According to certain embodiments, the method may further include displaying a graphics user interface on the display, when the finger providing the gesture input is not a finger registered for authentication through the fingerprint sensor, in the inactive state of the fingerprint sensor.

According to certain embodiments, the method may further include comparing fingerprint information of the finger providing the gesture with fingerprint information, stored in a memory, of fingers registered for authentication through the fingerprint sensor and authenticating a user providing the gesture input based at least in part on the comparison.

According to certain embodiments, the method may further include providing a graphics user interface guiding fingerprint registration in a moving state for at least one direction.

Figure 6A:
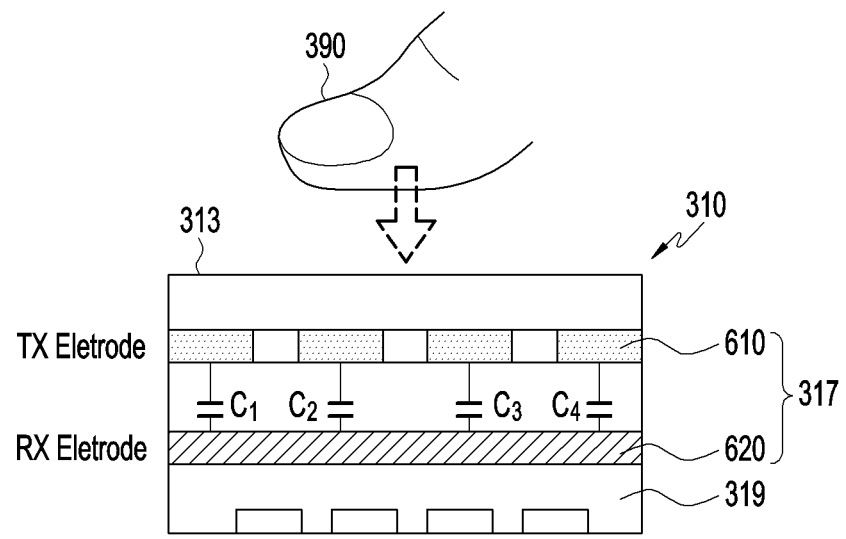
FIG. 6A and FIG. 6B are views for describing a method for detecting pressure information according to certain embodiments.
Figure 6B:
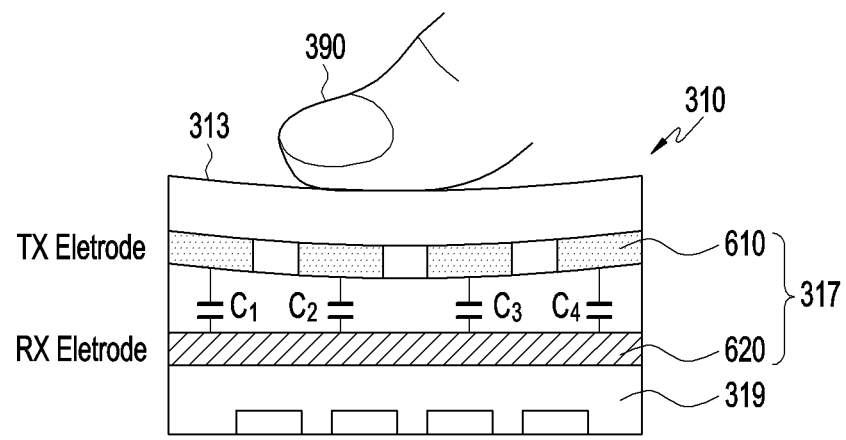

FIGS. 6A and 6B are views for describing a method for detecting pressure information according to certain embodiments.

Referring to FIG. 6A, the touchscreen panel 317 may be stacked on the display panel 319. The touchscreen panel 317 may include a plurality of TX electrodes 610 and a plurality of RX electrodes 620 in order to detect a touch/hovering input. For example, the electrodes of the touchscreen panel 317 may have a linear grid pattern or diamond pattern. When there is no pressure applied by a touch of the finger 390, a constant capacitance may be formed between a TX electrode and an RX electrode (that is, $C_1=C_2=C_3=C_4$).

Referring to FIG. 6B, once a pressure is applied to the front cover 313 (or front surface) by the touch of the finger 390, the distance between a TX electrode and an RX electrode may change. The electronic device (e.g., the electronic device 101, 301, or 401) or the processor (e.g., the processor 120 or 421) may obtain a capacitance change value, z (or a delta value) corresponding to the distance change (that is, $C_1=C_4<C_2=C_3$).

Figure 7A:
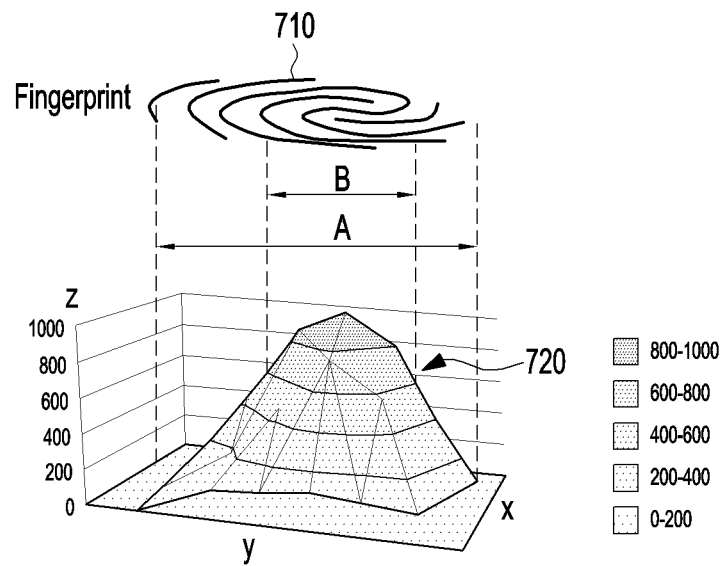
FIG. 7A and FIG. 7B are views for describing an example of pressure information according to certain embodiments.
Figure 7B:
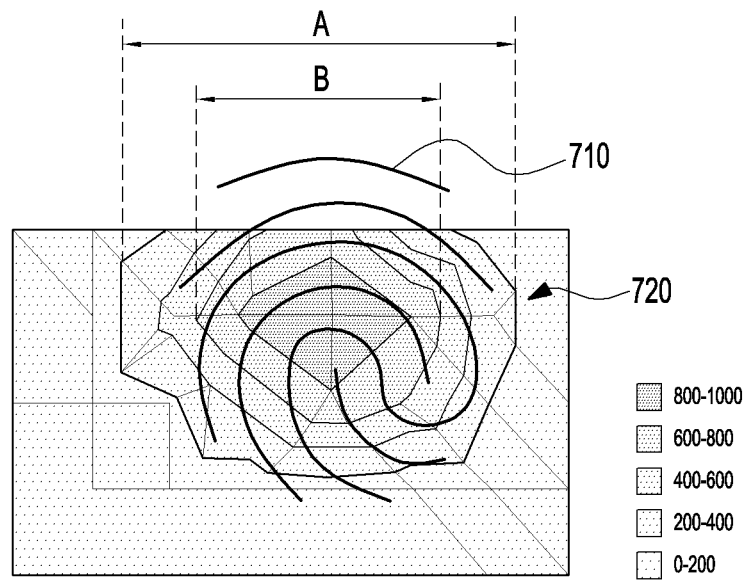

FIGS. 7A and 7B are views for describing an example of pressure information according to certain embodiments.

FIG. 7A three-dimensionally shows a distribution of pressure values, that is, the pressure distribution 720, obtained using a touch sensor (e.g., the pressure sensor 330 or the touch sensor 463) or a display (e.g., the touchscreen display 310 or 461). In FIG. 7A, pressure values (or capacitance values indicating pressures) obtained using a touch sensor with respect to x and y coordinates on the surface of the touch sensor are expressed as z values.

FIG. 7B two-dimensionally shows a distribution of pressure values obtained using a touch sensor.

In FIGS. 7A and 7B, the pressure distribution 720 corresponding to a fingerprint 710 may include a region A corresponding to all pressure values and a region B corresponding to pressure values that are greater than or equal to a designated threshold value among all the pressure values.

The electronic device (e.g., the electronic device 101, 301, or 401) or the processor (e.g., the processor 120 or 421) (hereinafter, using the processor as an example) may store the rate of an area of the region B with respect to an area of the region A as pressure information (or a pressure profile) by a finger in a memory (or a pressure information database).

The processor may measure z values generated in a touch input operation through the touch sensor or the display. The processor may calculate a touch area on which the z values are generated based on touch coordinates information. The processor may calculate an effective pressure area (or the area of the region B), on which the z values are greater than or equal to the particular threshold value from the touch area (or the area of the region A), based on touch coordinates. The rate of the effective pressure area with respect to the touch area may be identified as a specific rate according to a finger type.

Figure 8:
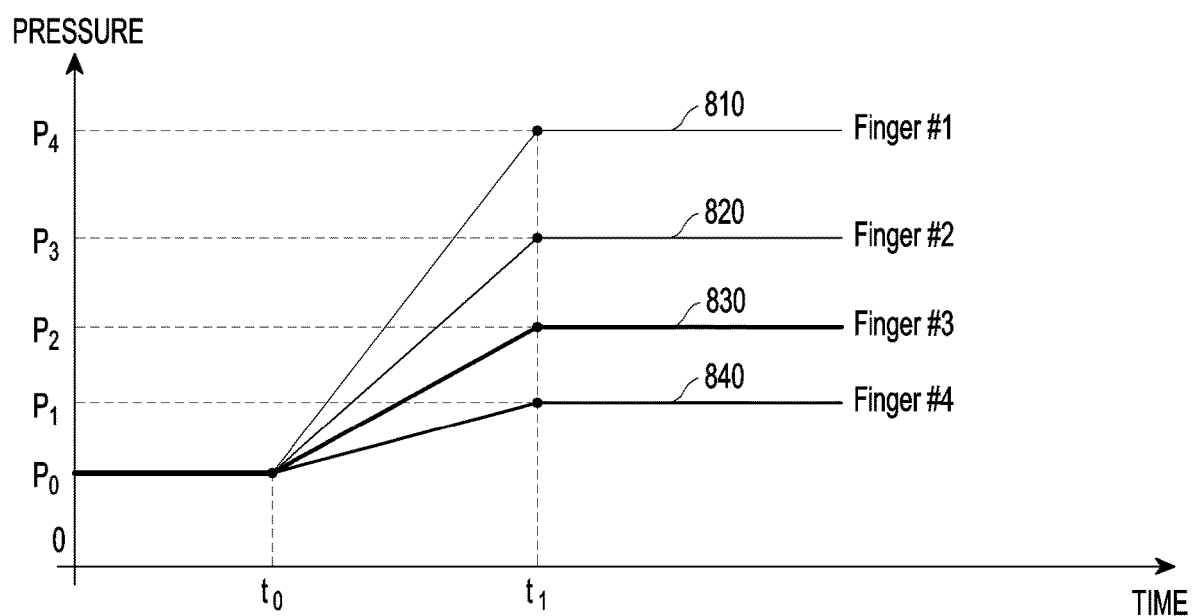
FIG. 8 is a diagram for describing another example of pressure information according to certain embodiments.

FIG. 8 is a diagram for describing another example of pressure information according to certain embodiments.

The pressure information may include the pressure increase rate of a touch gesture input measured during a specific time. The pressure level and the pressure increase rate in the touch input may vary with a user's finger type (e.g., a thumb, an index finger, a middle finger, a ring finger, or a little finger), finger joint length, finger's size, etc. For example, a thumb may have higher pressure level and pressure increase rate than an index finger. Since the pressure level corresponding to the finger may change with user's intention, the electronic device (e.g., the electronic device 101, 301, or 401) or the processor (e.g., the processor 120 or 421) may manage pressure profiles based on a pressure increase rate indicating a specific change rate corresponding to a finger.

FIG. 8 shows pressure change lines 810, 820, 830, and 840 over time with respect to the first through fourth fingers.

Table 1 shows a pressure profile.

TABLE 1

| Finger Type | Pressure Level at Time ($t_0$) | Pressure Level at Time ($t_1$) $\Delta t_1 = t_1 - t_0$ | Pressure Increase Rate (SLOPE) |
|---|---|---|---|
| Finger#1 | $P_0$ | $P_4$ | $(P_4 - P_0)/\Delta t_1$ |
| Finger#4 | $P_0$ | $P_1$ | $(P_1 - P_0)/\Delta t_1$ |

Figure 9A:
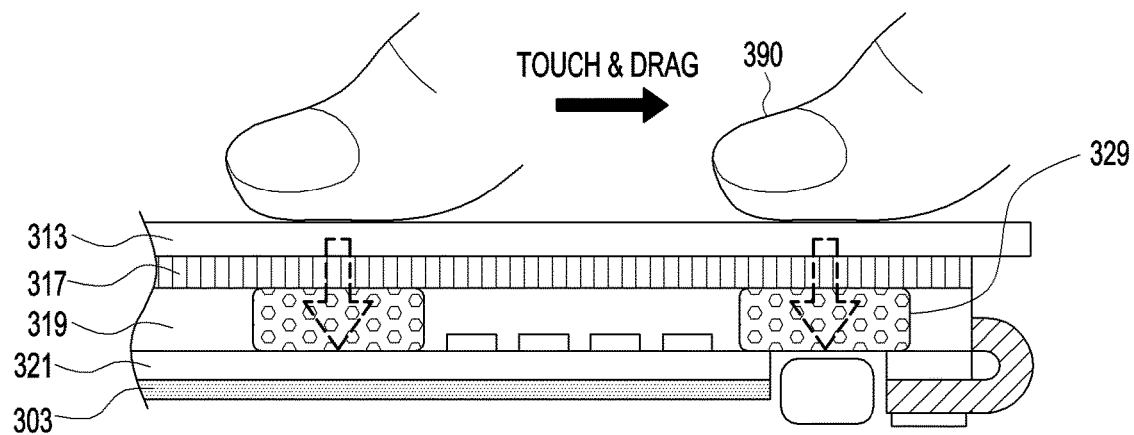
FIG. 9A and FIG. 9B are views for describing another example of pressure information according to certain embodiments.
Figure 9B:
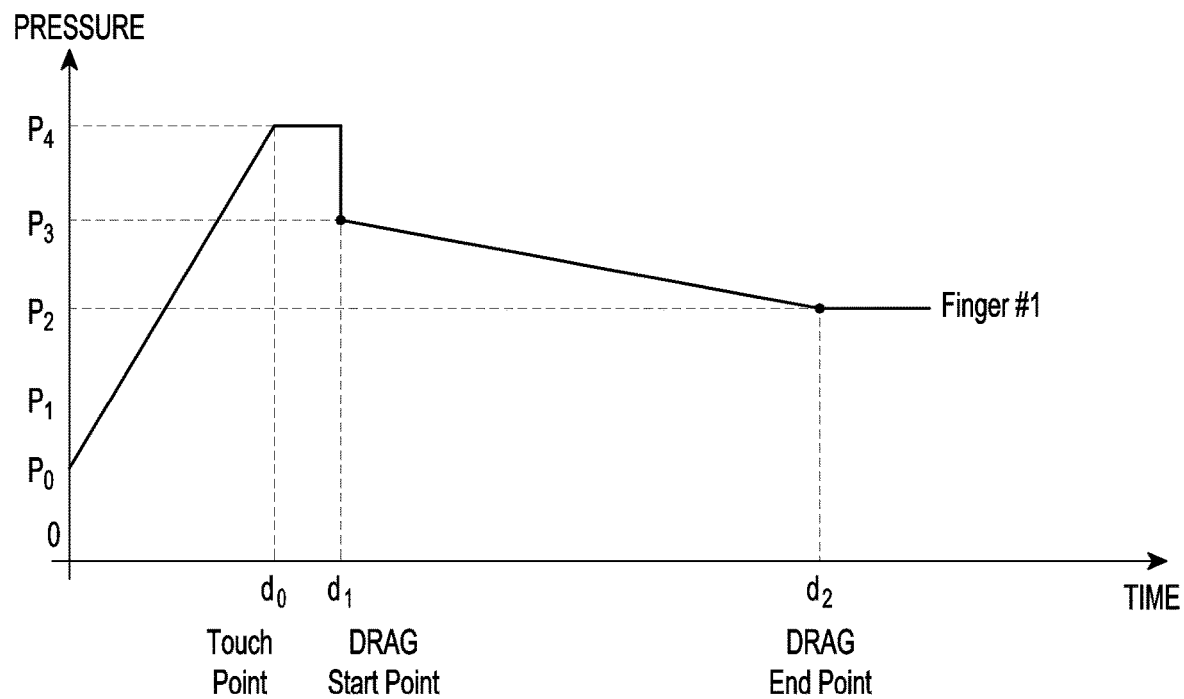

FIGS. 9A and 9B are views for describing another example of pressure information according to certain embodiments.

FIG. 9A shows an operation in which a user's finger touches an object 329 displayed on the display panel 319 and drags the same.

FIG. 9B shows a pressure change rate with respect to a drag/swipe gesture input.

The electronic device (e.g., the electronic device 101, 301, or 401) or the processor (e.g., the processor 120 or 421) (hereinafter, using the processor as an example) may manage a pressure profile based on a pressure change rate corresponding to a drag/swipe touch coordinates shift. In the drag/swipe touch movement by the user, a pressure change may occur in a pressure level that is different from a pressure level caused by a touch input in a stationary state, depending on a finger type. The processor may identify a finger based on the pressure change rate generated in the drag/swipe touch movement. The processor may measure the pressure level of the touch input in the stationary state, calculate the pressure level of the touch input generated in the drag/swipe touch movement, and thus calculate the pressure change rate corresponding to a finger. At a start point of the drag/swipe touch movement, a pressure decrease may occur from a stationary state point. The pressure profile may be determined as the rate of a pressure measurement value $P_4$ at a stationary state point $d_0$ with respect to a pressure measurement value $P_3$ at a drag/swipe touch movement start point $d_1$.

Figure 10A:
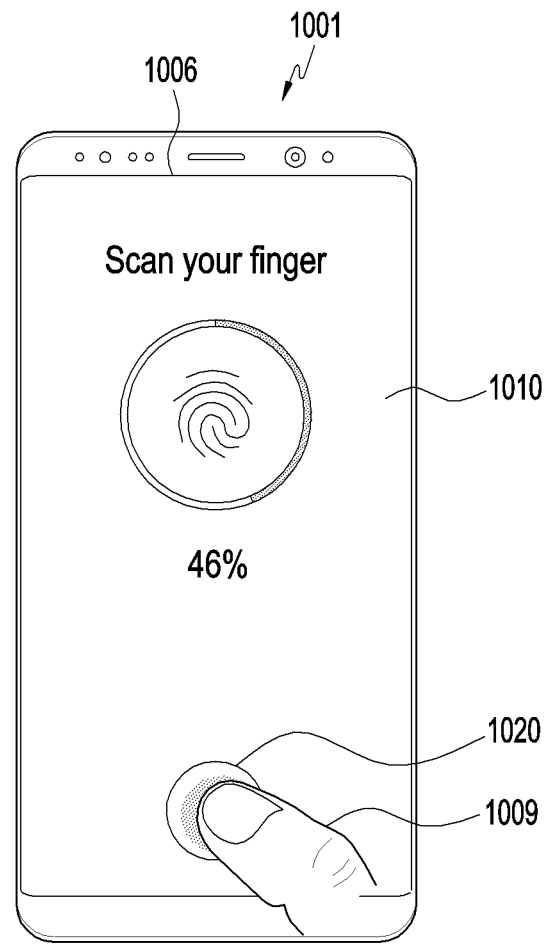
FIG. 10A, FIG. 10B, and FIG. 10C are views for describing a method for registering a fingerprint in an electronic device according to certain embodiments.
Figure 10B:
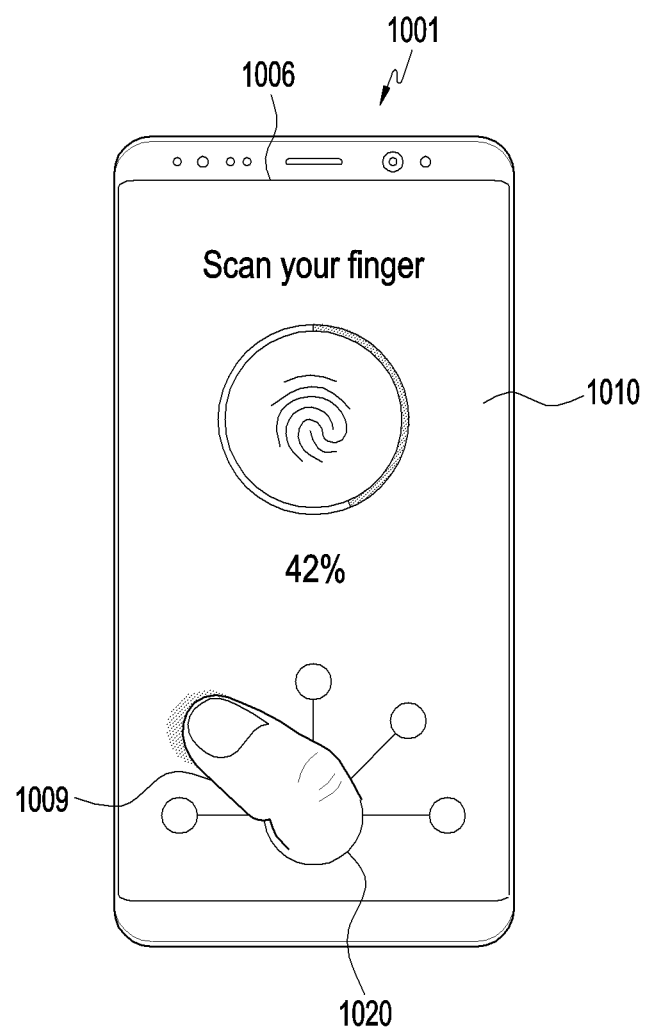
Figure 10C:
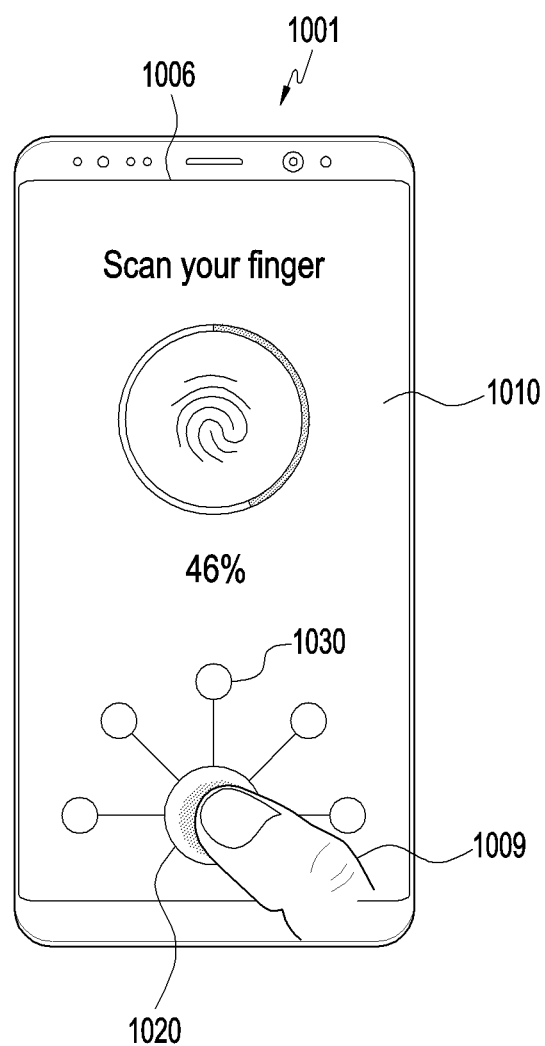

FIGS. 10A through 10C are views for describing a method for registering a fingerprint in an electronic device according to certain embodiments.

Referring to FIG. 10A, an electronic device 1001 (e.g., the electronic device 101, 301, or 401) or the processor (e.g., the processor 120 or 421) (hereinafter, using the electronic device 1001 as an example) may display a user interface 1010 for registering a fingerprint of a user 1009 on a display 1006.

The user interface 1010 may include a first object 1020 or a first graphics element for registering a fingerprint in the stationary state.

The electronic device 1001 may acquire a fingerprint image in the stationary state when a touch input stops on the first object 1020, and may generate user authentication information including the fingerprint image and a pressure profile. In an embodiment, the electronic device 1001 may display the user interface 1010 in response to user input.

In an embodiment, the user input may include at least one of a preset touch/hovering gesture (e.g., at least one of a swipe gesture, a drag gesture, or a scroll) on the display (e.g., the display device 160), selection of a graphics element displayed on the display, a voice command, or a motion input.

Referring to FIGS. 10B and 10C, the user interface 1010 may include at least one second object 1030 or second graphics element for registering a fingerprint in a moving state.

In an embodiment, the electronic device 1001 may display the first object 1020 and the second object 1030 for registering the fingerprint in the moving state.

The electronic device 1001 may register fingerprint information corresponding to the touch input and pressure profile information extracted from the fingerprint information as the user authentication information.

The electronic device 1001 may register the fingerprint information in the stationary state and/or the fingerprint information in the moving state as authentication information for a user or a finger of the user.

In an embodiment, the electronic device 1001 may provide different fingerprint registration user interfaces depending on the stationary/moving touch state.

In an embodiment, the electronic device 1001 may receive a fingerprint input and a touch input corresponding to a gesture input (e.g., a drag/swipe gesture) in various moving directions. The electronic device 1001 may display at least one second object 1030 indicating various moving directions. For example, the electronic device 1001 may receive a drag/swipe touch input moving in a direction corresponding to 0 degrees, 45 degrees, 90 degrees, 135 degrees, or 180 degrees, from the second object 1030 to the first object 1020, through the display 1006. The electronic device 1001 may generate a pressure profile corresponding to each direction from a drag/swipe touch input received in the direction. The electronic device 1001 may obtain the fingerprint image when the touch input stops on the first object 1020 or moves on the first object 1020, and may generate the user authentication information including the fingerprint image and the pressure profile.

In an embodiment, the electronic device 1001 may receive a touch input to continuously drag (or swipe) the first object 1020 and the second object 1030 while maintaining the touch input.

Figure 11A:
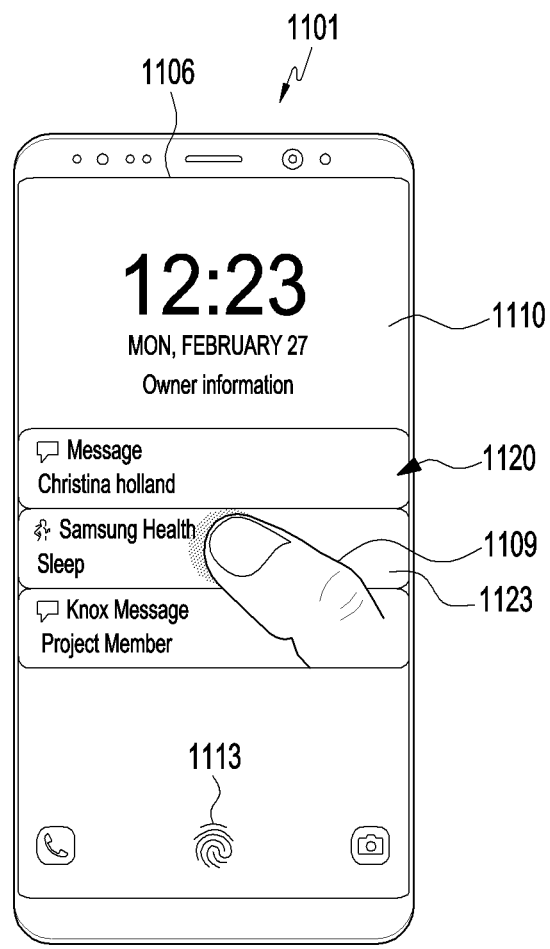
FIG. 11A, FIG. 11B, and FIG. 11C are views for describing a method for operating an electronic device according to certain embodiments.
Figure 11B:
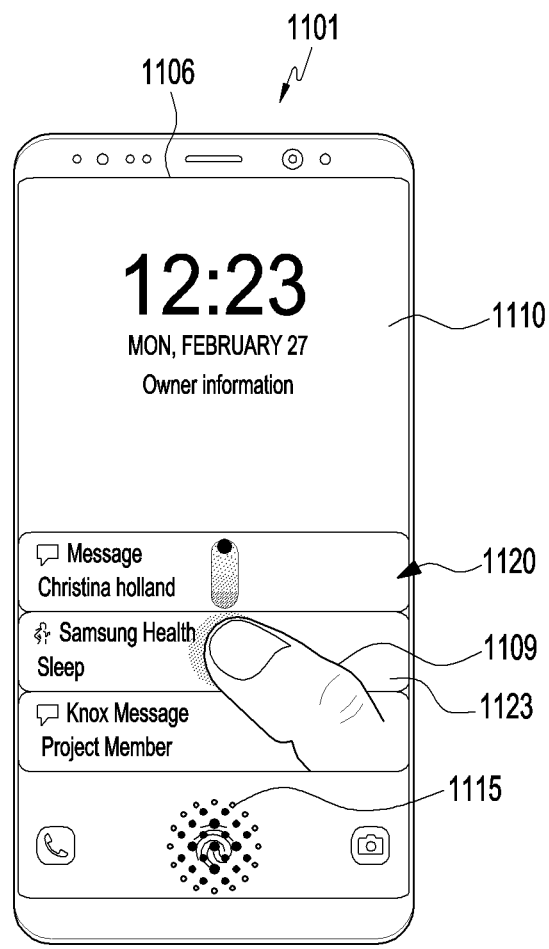
Figure 11C:
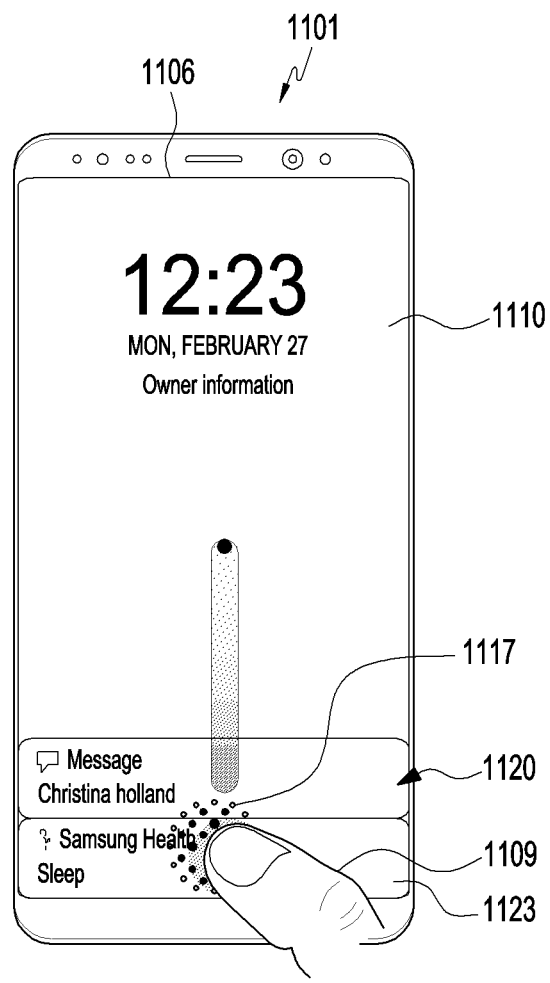

FIGS. 11A through 11C are views for describing a method for operating an electronic device according to certain embodiments.

Referring to FIG. 11A, an electronic device 1101 (e.g., the electronic device 101, 301, or 401) or the processor (e.g., the processor 120 or 421) (hereinafter, using the electronic device 1101 as an example) may display a notification panel 1120 including at least one notification message 1123 on a user interface 1110 on a display 1106 (e.g., the touchscreen display 310 or 461).

In an embodiment, the electronic device 1101 may display a first object 1113 indicating a fingerprint input position (or region of the display underlapped by the fingerprint sensor).

Referring to FIG. 11B, the electronic device 1101 may detect the drag gesture input of a user 1109 to select and drag the notification message 1123.

In response to the drag gesture input, the electronic device 1101 may obtain/receive pressure information regarding a touch input from the display 1106 or the touch sensor 463 (e.g., the touch sensor 251 or the pressure sensor 330) and obtain a pressure profile from the pressure information. The electronic device 1101 may compare the obtained pressure profile with a pressure profile stored in the memory (e.g., the memory 430). The processor 1101 may determine or identify whether the gesture input is an input using a registered finger based at least in part on the result of the comparison (as opposed to an unregistered finger, or a stylus). When the gesture input is an input using a registered finger, the electronic device 1101 may activate the fingerprint sensor (e.g., the fingerprint sensor 340 or 435).

In an embodiment, the electronic device 1101 may display a second object 1115 indicating that the fingerprint sensor has been activated. Thus, during the downward drag/swipe, the electronic device can determine or identify whether a finger or other object making an input gesture is a registered finger by comparing pressure profiles. If the input gesture is a registered finger, the fingerprint sensor is activated before the finger 1109 reaches the fingerprint sensor during the drag.

Referring to FIG. 11C, the electronic device 1101 may detect a drag gesture input of the user 1109 to select and drag the notification message 1123, the first object 1113, or the second object 1115.

In response to the drag gesture input of the user 1109 to drag the notification message 1123 above the first object 1113 or the second object 1115, the electronic device 1101 may obtain/receive fingerprint information from the fingerprint sensor and compare the received fingerprint information with fingerprint information stored in the memory 430.

Once the received fingerprint information matches the stored fingerprint information, the electronic device 1101 may enlarge and display the notification message 1123.

In an embodiment, the electronic device 1101 may display a third object 1117 indicating a fingerprint authentication process or result.

Figure 12:
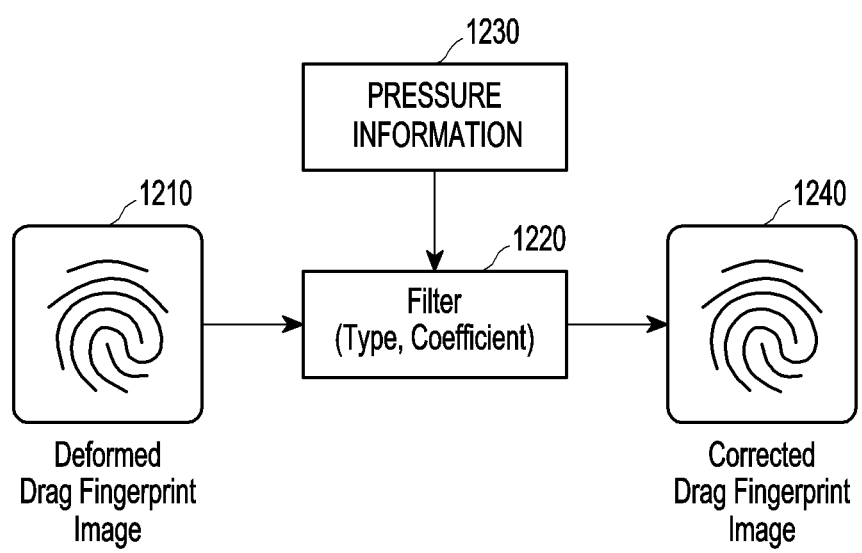
FIG. 12 is a view for describing a method for operating an electronic device according to certain embodiments.

FIG. 12 is a view for describing a method for operating an electronic device according to certain embodiments.

The electronic device (e.g., the electronic device 101, 301, or 401) or the processor (e.g., the processor 120 or 421) (hereinafter, referred to as the processor) may obtain pressure information 1230 (or a pressure profile) corresponding to a drag gesture input.

The processor may correct a fingerprint image 1210 obtained using a fingerprint sensor (e.g., the fingerprint sensor 340 or 435) by using a filter 1220.

In an embodiment, the processor may predict the degree of deformation of the fingerprint image 120 based on the pressure information 1230 (e.g., a speed of a drag/swipe gesture and/or a pressure change rate of the drag/swipe gesture) and correct the predicted fingerprint image deformation.

For example, the processor may determine or identify a type and/or a coefficient (or a filtering parameter) of the filter 1220 based on the pressure information 1230 (e.g., the speed of the drag/swipe gesture and/or the pressure change rate of the drag/swipe gesture), and obtain a fingerprint image 1240 corrected according to an operation of the filter 1220 based on the determined type and/or coefficient. According to certain embodiments, the correction can occur while the finger is moving towards and before arriving at object 1115. Thus, when the fingerprint is detected, it is either corrected. In certain embodiments, the stored fingerprint image can be deformed according to the pressure information 1230 for comparison to a captured fingerprint image.

According to certain embodiments, a storage medium may have stored therein instructions which cause, when executed by at least one circuit (or at least one processor), the at least one circuit to perform at least one operation, which includes displaying a user interface (e.g., the user interface 1110) including an object (e.g., the notification message 1123) on a display (e.g., the display 1106) of the electronic device, receiving a gesture input for dragging the object toward a region of the display, the gesture input inputted through the display, identifying whether a finger providing the gesture input is a finger registered for authentication through a fingerprint sensor, and activating the fingerprint sensor based at least in part on the identification.

According to certain embodiments, unnecessary electric current consumption may be reduced by determining the time to activate a fingerprint sensor for fingerprint authentication through the extraction and comparison of a pressure profile corresponding to a user's touch input based on pressure profile information registered together with fingerprint information in a fingerprint registration process.

In certain embodiments, a fingerprint image corresponding to a drag/swipe gesture input is obtained in a fingerprint authentication process, the degree of deformation of the fingerprint image is predicted based on pressure profile information and the deformation of the fingerprint image is corrected, thereby increasing the fingerprint recognition rate.

In certain embodiments, by preferentially performing a fingerprint matching operation with respect to a fingerprint image candidate group mapped to pressure profile information, fingerprint authentication speed may be improved.

What is claimed is:

1. An electronic device comprising:
   a housing comprising a front surface and a rear surface oriented in a direction opposite to the front surface;
   a touchscreen display exposed through at least a portion of the front surface;
   a fingerprint sensor arranged between the touchscreen display and the rear surface underlapping a region of the touchscreen display when viewed from above the front surface;
   at least one processor operatively connected to the touchscreen display and the fingerprint sensor; and
   a memory operatively connected to the at least one processor,
   wherein the memory stores instructions for causing the at least one processor, when executed, to perform operations comprising:
   displaying a user interface comprising an object on the touchscreen display;
   receiving a gesture input for dragging the object toward the region, the gesture input inputted through the touchscreen display;
   identifying whether a finger providing the gesture input is a predetermined finger registered for authentication based on pressure profiles corresponding to a plurality of moving directions, while the fingerprint sensor is deactivated, wherein identifying further comprises identifying whether the finger is a thumb, index finger, middle finger, ring finger or a little finger while the fingerprint sensor is deactivated; and
   activating the fingerprint sensor based at least in part on the identification.

2. The electronic device of claim 1, wherein the operations further comprise providing a graphical user interface indicating activation of the fingerprint sensor.

3. The electronic device of claim 1, wherein the operations further comprise performing the identification based at least in part on at least one of:
   a pressure applied to the touchscreen display by the finger providing the gesture input;
   a rate of an effective pressure region formed by a touch to a touched region by the finger providing the gesture input;
   an increase rate of a pressure or region of the touch by the finger providing the gesture input; or
   a pressure change rate with respect to coordinates shift occurring by the gesture input.

4. The electronic device of claim 1, wherein the operations further comprise displaying a graphical user interface on the touchscreen display, when the finger providing the gesture input is not the predetermined finger registered for authentication through the fingerprint sensor, wherein the fingerprint sensor is in an inactive state of the fingerprint sensor at the beginning of the gesture input.

5. The electronic device of claim 1, wherein the memory stores pressure information associated with a plurality of fingers registered for authentication through the fingerprint sensor, wherein the plurality of fingers comprise the predetermined finger.

6. The electronic device of claim 5, wherein the operations further comprise:
   comparing fingerprint information of the finger providing the gesture with fingerprint information, stored in the memory, of the plurality of fingers registered for authentication through the fingerprint sensor; and
   authenticating a user providing the gesture input based at least in part on the comparison.

7. The electronic device of claim 1, wherein the operations further comprise providing a graphical user interface guiding fingerprint registration in a moving state.

8. The electronic device of claim 1, wherein the operations further comprise providing a graphical user interface guiding fingerprint registration in a moving state for a plurality of directions.

9. The electronic device of claim 1, wherein the operations further comprise correcting deformation of a fingerprint image based on pressure information of the gesture input.

10. The electronic device of claim 1, wherein the operations further comprises performing a fingerprint matching operation for a fingerprint image candidate group mapped to pressure information of the gesture input.

11. A method for operating an electronic device, the method comprising:
    displaying a user interface comprising an object on a display of the electronic device;
    receiving a gesture input for dragging the object toward a region of the display, the gesture input inputted through the display;
    identifying whether a finger providing the gesture input is a predetermined finger registered for authentication based on pressure profiles corresponding to a plurality of moving directions, while a fingerprint sensor is deactivated, wherein identifying further comprises identifying whether the finger is a thumb, index finger, middle finger, ring finger or a little finger while the fingerprint sensor is deactivated; and activating the fingerprint sensor based at least in part on the identification.

12. The method of claim 11, wherein the identification is performed based at least in part on at least one of:
  a pressure applied to the display by the finger providing the gesture input;
  a rate of an effective pressure region formed by a touch to a touched region by the finger providing the gesture input;
  an increase rate of a pressure or region of the touch by the finger providing the gesture input; or
  a pressure change rate with respect to coordinates shift occurring by the gesture input.

13. The method of claim 11, further comprising displaying a graphical user interface on the display, when the finger providing the gesture input is not the predetermined finger registered for authentication through the fingerprint sensor.

14. The method of claim 11, further comprising:
  comparing fingerprint information of the finger providing the gesture with fingerprint information, stored in a memory, of a plurality of fingers registered for authentication, wherein the plurality of fingers comprise the predetermined finger, through the fingerprint sensor; and
  authenticating a user providing the gesture input based at least in part on the comparison.

15. The method of claim 11, further comprising providing a graphical user interface guiding fingerprint registration in a moving state for at least one direction.

16. A non-transitory storage medium having stored therein instructions which cause, when executed by at least one circuit, the at least one circuit to perform at least one operation which comprises:
  displaying a user interface comprising an object on a display of a electronic device;
  receiving a gesture input for dragging the object toward a region of the display, the gesture input inputted through the display;
  identifying whether a finger providing the gesture input is a predetermined finger registered for authentication based on pressure profiles corresponding to a plurality of moving directions, while a fingerprint sensor is deactivated, wherein identifying further comprises identifying whether the finger is a thumb, index finger, middle finger, ring finger or a little finger while the fingerprint sensor is deactivated; and
  activating the fingerprint sensor based at least in part on the identification.

17. The storage medium of claim 16, wherein the at least one operation further comprises performing the identification based at least in part on at least one of:
  a pressure applied to the display by the finger providing the gesture input;
  a rate of an effective pressure region formed by a touch to a touch region touched by the finger providing the gesture input;
  an increase rate of a pressure or region of the touch by the finger providing the gesture input; or
  a pressure change rate with respect to coordinates shift occurring by the gesture input.

18. The storage medium of claim 16, wherein the at least one operation further comprises displaying a graphical user interface on the display, when the finger providing the gesture input is not the predetermined finger registered for authentication through the fingerprint sensor, during non-activation of the fingerprint sensor.

19. The storage medium of claim 16, wherein the at least one operation further comprises:
  comparing fingerprint information of the finger providing the gesture with fingerprint information, stored in a memory, of fingers registered for authentication through the fingerprint sensor; and
  authenticating a user providing the gesture input based at least in part on the comparison.

20. The storage medium of claim 16, wherein the at least one operation further comprises providing a graphics user interface guiding fingerprint registration in a moving state for at least one direction.

\* \* \* \* \*